United States Patent
Wu

(10) Patent No.: US 8,265,383 B2
(45) Date of Patent: Sep. 11, 2012

(54) METHOD AND COMMUNICATION TERMINAL FOR SEARCHING PHONE BOOK FOR DESIRED CONTACTS

(75) Inventor: Guo-Qiang Wu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 747 days.

(21) Appl. No.: 12/464,872

(22) Filed: May 13, 2009

(65) Prior Publication Data
US 2009/0285477 A1 Nov. 19, 2009

(30) Foreign Application Priority Data
May 13, 2008 (CN) .......................... 2008 1 0301551

(51) Int. Cl.
*G06K 9/00* (2006.01)
*G06K 9/34* (2006.01)
(52) U.S. Cl. ...................................................... 382/165
(58) Field of Classification Search .................. 382/162, 382/164, 165, 167, 218–220, 272; 345/150, 345/431, 589, 593, 597, 835; 358/1.9, 515, 358/517, 518, 530
See application file for complete search history.

(56) References Cited

U.S. PATENT DOCUMENTS

| | | | | |
|---|---|---|---|---|
| 5,911,003 A * | 6/1999 | Sones | ........................... | 382/162 |
| 6,393,147 B2 * | 5/2002 | Danneels et al. | .............. | 382/165 |
| 6,549,213 B1 * | 4/2003 | Sadka | ........................... | 345/593 |
| 6,628,824 B1 * | 9/2003 | Belanger | ....................... | 382/165 |
| 6,741,260 B2 * | 5/2004 | Hirayama et al. | ............. | 345/589 |
| 6,914,613 B2 * | 7/2005 | Marchand et al. | ............. | 345/593 |
| 7,561,735 B2 * | 7/2009 | Levin et al. | .................... | 382/162 |
| 7,970,200 B2 * | 6/2011 | Oguni et al. | ................... | 382/145 |
| 2009/0245617 A1 * | 10/2009 | Bhatti et al. | ................... | 382/141 |
| 2009/0285477 A1 * | 11/2009 | Wu | ................................ | 382/165 |

\* cited by examiner

*Primary Examiner* — Amir Alavi
(74) *Attorney, Agent, or Firm* — Altis Law Group, Inc.

(57) ABSTRACT

A method for searching a phone book for desired contacts and a communication terminal using the method are provided. The method includes the steps of: enabling an image acquisition device to capture a present image, calculating a color value of the present image, comparing a reference color value for each contact in the phone book with the color value of the present image, selecting the desired contacts for which the reference color value matches the color value of the present image and displaying the desired contacts.

15 Claims, 9 Drawing Sheets

Desired contacts

| Jane |
| Lily |
| ...... |
| Storing |

Select                Exit

FIG. 6

METHOD AND COMMUNICATION TERMINAL FOR SEARCHING PHONE BOOK FOR DESIRED CONTACTS

BACKGROUND

1. Technical Field

Embodiments of the present disclosure relate to searching methods, and more particularly to a method for searching a phone book for desired contacts and a communication terminal using the method.

2. Description of Related Art

As storage capacity increases, users tend to store more data. Accordingly, current phone books of communication terminals such as mobile telephones can contain hundreds of contacts and images. Consequently, the length of time taken to search a phone book for a desired contact may be an inconvenience.

What is needed, therefore, is a method for quickly searching a phone book for desired contacts and a communication terminal using the method.

BRIEF DESCRIPTION OF THE DRAWINGS

FIG. 6 is a schematic menu showing the desired contacts.

DETAILED DESCRIPTION

All of the processes described hereinafter may be embodied in, and fully automated via, functional code modules executed by one or more general purpose computers or processors. The code modules may be stored in any type of computer-readable mediums or other storage devices. Some or all of the methods may alternatively be embodied in specialized computer hardware.

Figure 1:
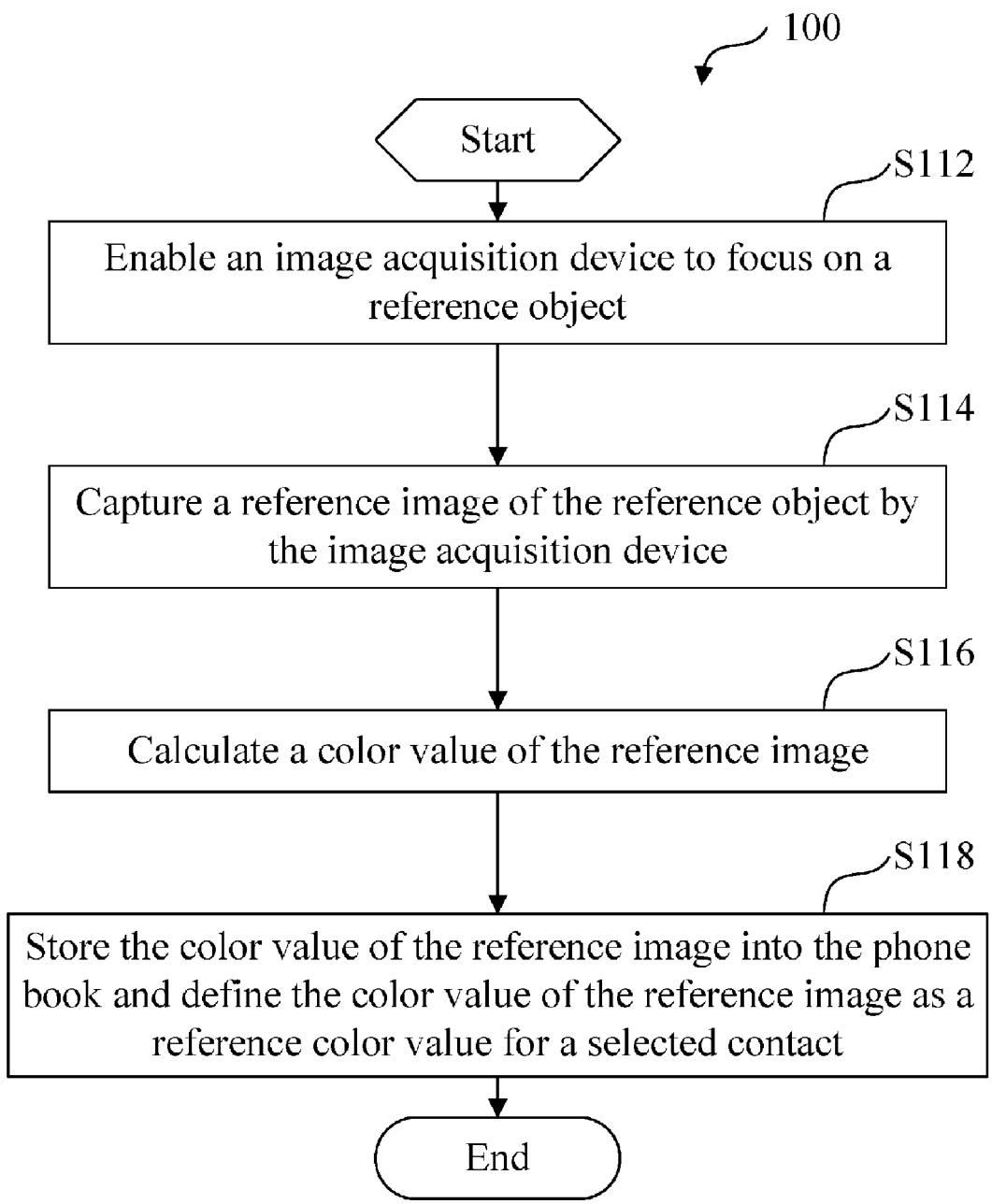
FIG. 1 is a flow chart of one embodiment of a method for defining a reference color value for each contact in a phone book.
Figure 2:
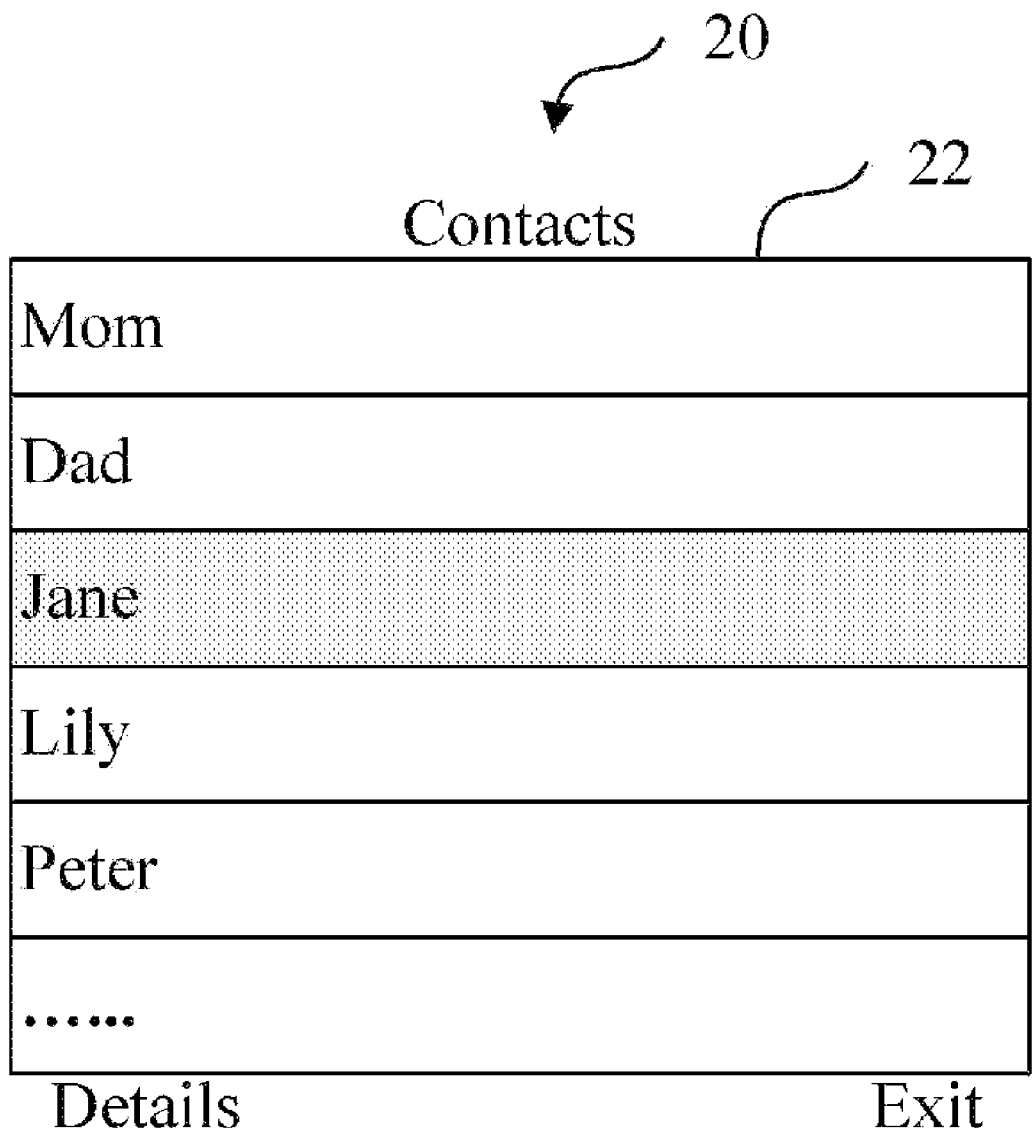
FIG. 2 is a menu showing the contacts in the phone book.

Referring to FIG. 1, a method 100 is shown that may be used to define a reference color value for each contact in a phone book 22 as shown in FIG. 2. In this embodiment, the phone book 22 is stored in a storage medium 34 of a communication terminal 30 (shown in FIG. 8).

Figure 3:
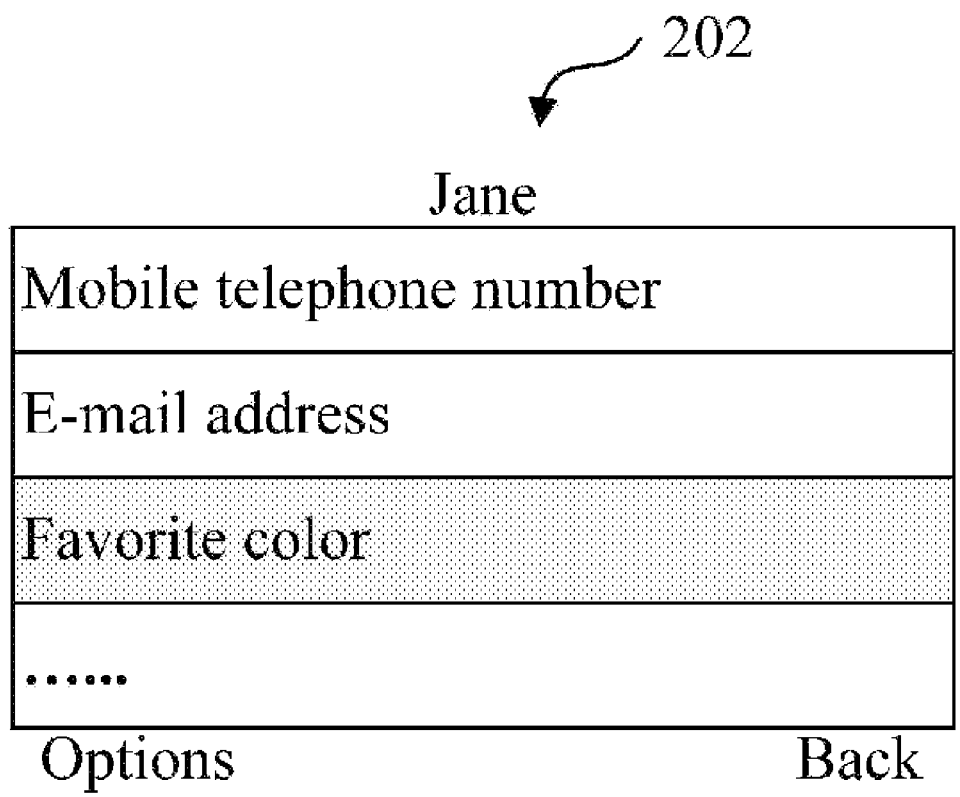
FIG. 3 is a menu showing choices of any one of the contacts.

In Step S112, referring to FIG. 2, the communication terminal 30 displays a menu 20 showing the contacts in the phone book 22. If one of the contacts "Jane" is selected, the communication terminal 30 displays a sub-menu 202 as shown in FIG. 3. The sub-menu 202 may include multiple choices such as "Mobile telephone number", "E-mail address", "Favorite color", etc. Each of the "Mobile telephone number" and the "E-mail address" is defined as a communication address.

Figure 4:
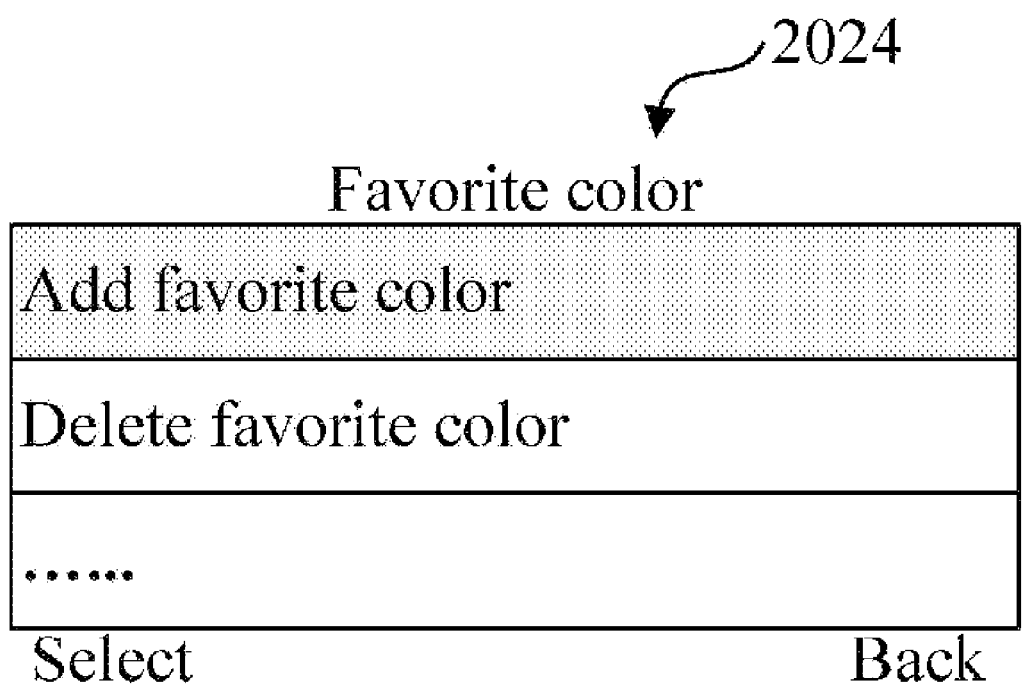
FIG. 4 is a menu showing choices that may be performed on the reference color value.

When the choice "Favorite color" is selected, a sub-sub-menu 2024 is displayed as shown in FIG. 4. The sub-sub-menu 2024 may include multiple choices such as "Add favorite color", "Delete favorite color", etc. When the choice "Add favorite color" is selected, the communication terminal 30 automatically enables an image acquisition device 32 (shown in FIG. 8) of the communication terminal 30.

In Step S114, the user may operate the image acquisition device 32 to focus on a reference object and capture a reference image of the reference object. The reference object may be a segment of the user's clothes, a desk surface, and other objects that is in close proximity to the user.

In step S116, the communication terminal 30 extracts RGB triplets (see below) of characteristic points of the reference image to calculate an average RGB triplet. The average RGB triplet may be regarded as the color value of the reference image.

As an illustration, the characteristic points may be such points which are appropriate to represent the reference image such as points at a corner and/or a central point of the reference image. It may be understood that various image processing methods, such as image segmentation methods may be used to obtain such characteristic points from the reference image. For the sake of being easy to calculate the color value, the reference image may be in a single color.

Several common color models can be applied, such as a RGB (red, green, blue) color model, an HSV (hue, saturation, value) color model, and a CMYK (cyan, magenta, yellow, black) color model. In this embodiment, the RGB color model is used as an illustration. A color in the RGB color model is described by indicating how much of each of red, green, and blue is included. The color is expressed as an RGB triplet (r, g, b), each component of which can vary with a range from zero to a defined maximum value. If all the components are at zero, the result is black; if all are at maximum, the result is white. The range may be quantified in several different ways.

In computing, the component values are often stored as integer numbers in the range 0 to 255 ($2^8-1$), the range that a single 8-bit byte can offer by encoding 256 distinct values. RGB values encoded in 24 bits per pixel are specified using three 8-bit unsigned integers (0 through 255) representing the intensities of red, green, and blue. As such, the red color is expressed as an RGB triplet (255, 0, 0), the blue color is expressed as an RGB triplet (0, 0, 255), the pink color is expressed as an RGB triplet (255, 192, 203), the gold color is expressed as an RGB triplet (255, 215, 0), and the silver color is expressed as an RGB triplet (192, 192, 192).

In step S118, the communication terminal 30 stores the color value of the reference image into the phone book 22 and defines the color value of the reference image as the reference color value for the selected contact "Jane".

Figure 5:
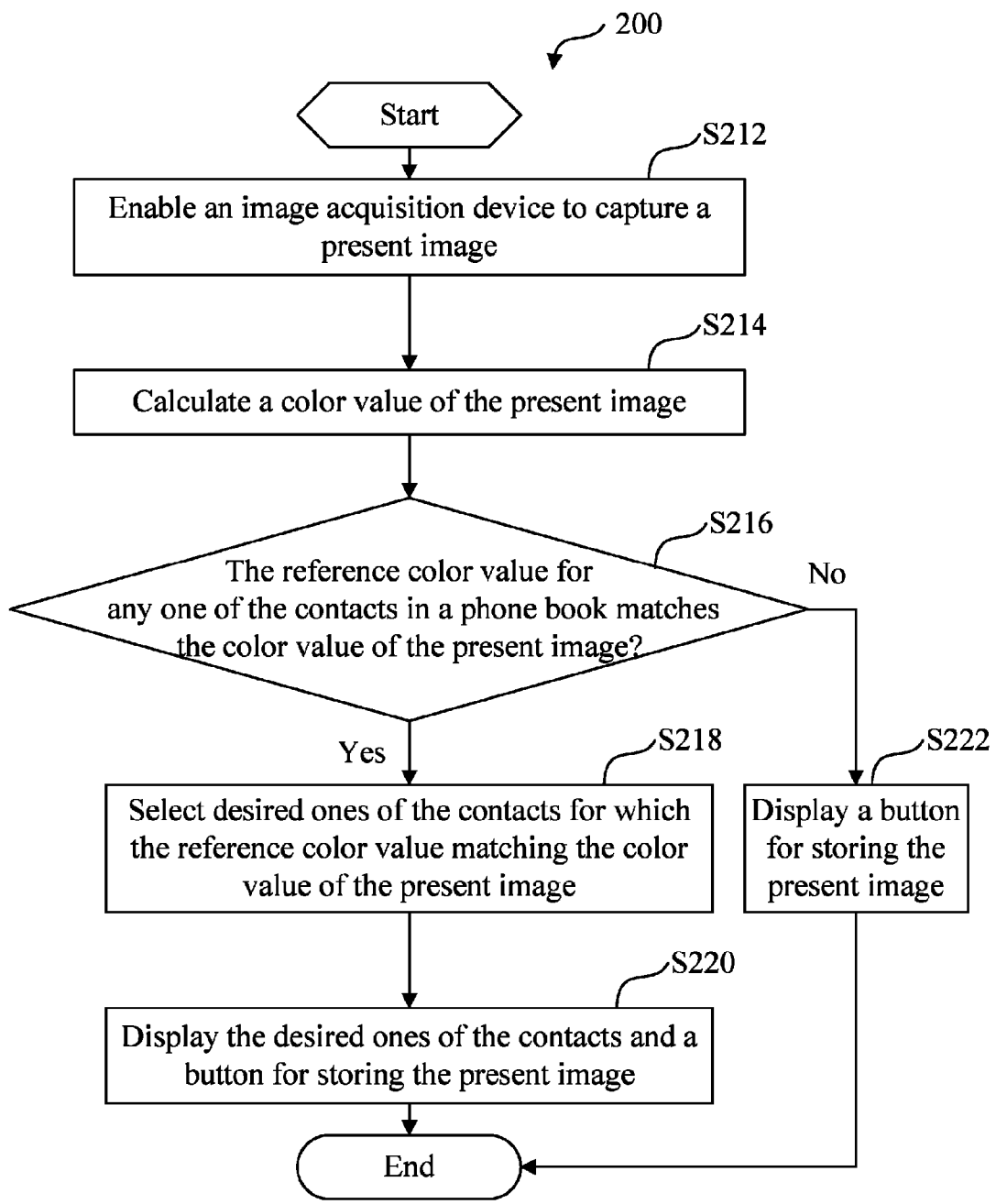
FIG. 5 is a flow chart of one embodiment of a method for searching the phone book for desired contacts that match the search criteria.

Referring to FIG. 5, a method 200 is shown that is used to search the phone book 22 for desired ones of the contacts.

In step S212, the user operates the communication terminal 30 to enable the image acquisition device 32 to capture a present image of a present object.

In step S214, the communication terminal 30 extracts the RGB triplets of the characteristic points of the present image to calculate the average RGB triplet. The average RGB triplet may be regarded as the color value of the present image.

In step S216, the communication terminal 30 compares the reference color value for each of the contacts in the phone book 22 with the color value of the present image one by one, and determines whether the reference color value for any one of the contacts matches the color value of the present image. If the reference color value for any one of the contacts matches the color value of the present image, the procedure goes to step S218. Otherwise, the procedure goes to step S222.

In this embodiment, the communication terminal 30 calculates a difference between the reference color value for each of the contacts and the color value of the present image, and compares the numerical value of the difference with a predetermined threshold. For example, the reference color value is an RGB triplet (255, 0, 0) of the red color, and the color value of the present image is an RGB triplet (251, 3, 2). The numerical value of the difference between the two RGB triplets (255, 0, 0) and (251, 2, 3) is an RGB triplet (4, 2, 3). If the predetermined threshold is an RGB triplet (5, 5, 5), and then each component of the RGB triplet (4, 2, 3) is not larger than a corresponding one of the RGB triplet (5, 5, 5). As a result, the difference between the reference color value and the color value of the present image is not larger than the predetermined threshold. Therefore, the procedure goes to step S218.

In step S218, the communication terminal 32 selects the desired contacts for which the reference color value matches the color value of the present image, and temporarily stores the desired contacts into the storage medium 34.

In step S220, the communication terminal 32 reads the desired contacts temporarily stored in the storage medium 34 and displays a menu 26 as shown in FIG. 6. The menu 26 may include the desired contacts and a button "Storing" for storing the present image. When the button "Storing" is selected, the communication terminal 32 stores the present image into the storage medium 34.

In step S222, the communication terminal 32 displays another menu (not shown) only showing the button "Storing".

Figure 7:
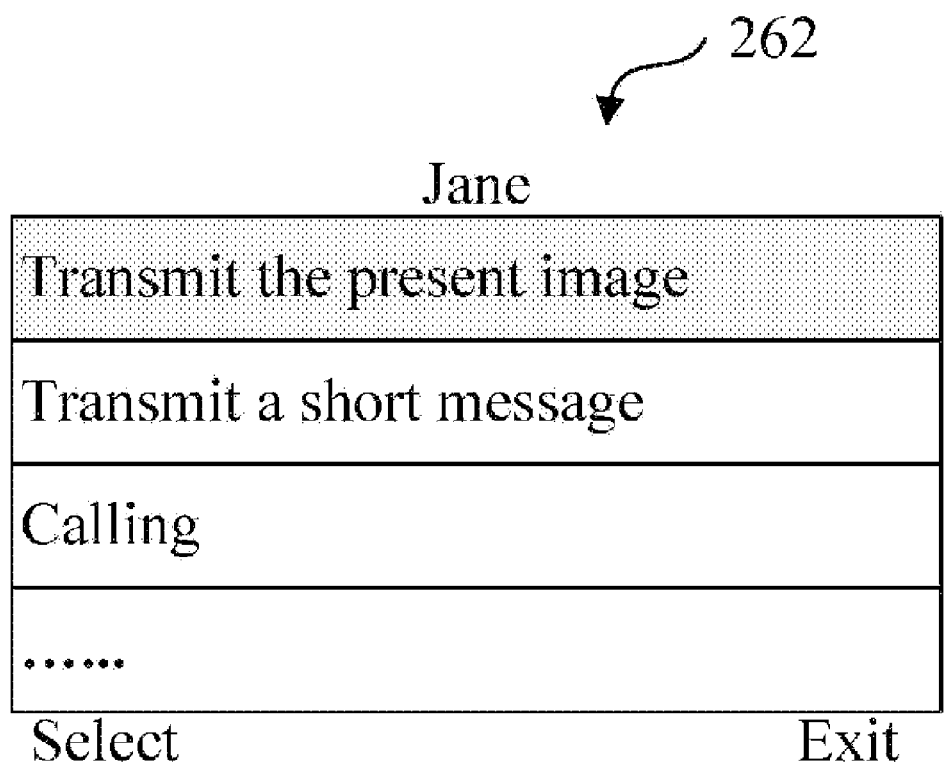
FIG. 7 is schematic menu showing multiple choices of one of the desired contacts.

If one of the desired contacts shown in FIG. 6 is selected, such as the desired contact "Jane", a sub-menu 262 showing multiple choices is displayed as shown in FIG. 7. As shown in FIG. 7, if the choice "Transmit the present image" is selected, the communication terminal 30 transmits the present image to the communication address of the desired contact "Jane". If the choice "Transmit a short message" is selected, the communication terminal 30 displays a textbox (not shown) for inputting the short message. If the choice "Calling" is selected, the communication terminal 30 dials the desired contact "Jane".

Figure 8:
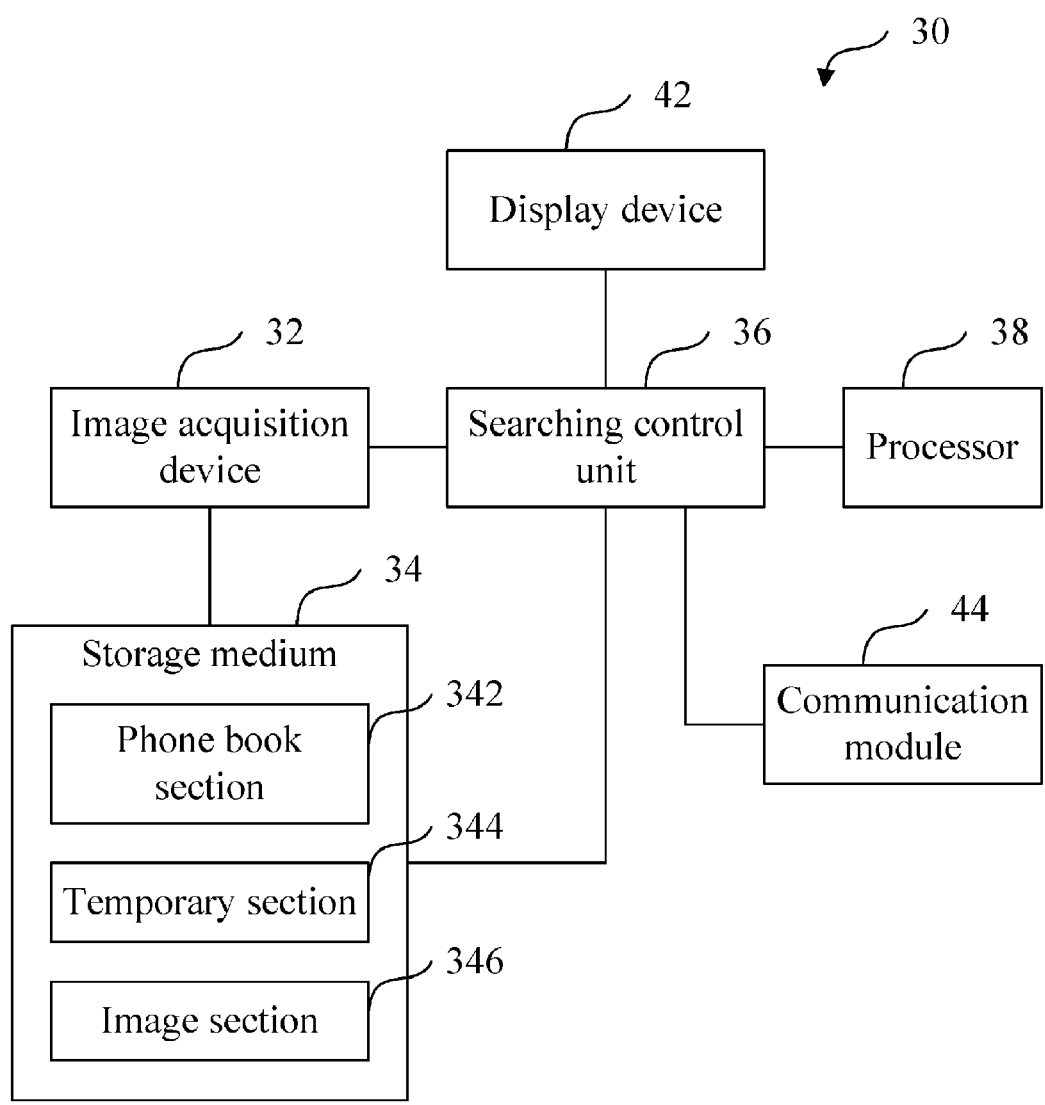
FIG. 8 is a schematic diagram of one embodiment of a communication terminal using the methods of FIG. 1 and FIG. 5.

FIG. 8 is a schematic diagram of one embodiment of the communication terminal 30 using the methods of FIG. 1 and FIG. 5. The communication terminal 30 includes the image acquisition device 32, the storage medium 34, a searching control unit 36, a processor 38, a display device 42 and a communication module 44.

The image acquisition device 32 is for capturing the reference images of the reference objects and the present images of the present objects. The image acquisition device 32 can be, for example, a pickup camera, a video camera or a universal serial bus (USB) webcam.

The storage medium 34 includes a phone book section 342, a temporary section 344 and an image section 346. The phone book section 342 is configured for storing the phone book 22. The temporary section 344 is configured for temporarily storing the desired contacts for which the reference color value matches the color value of the present image. The image section 346 is configured for storing the images captured by the image acquisition device 32.

Figure 9:
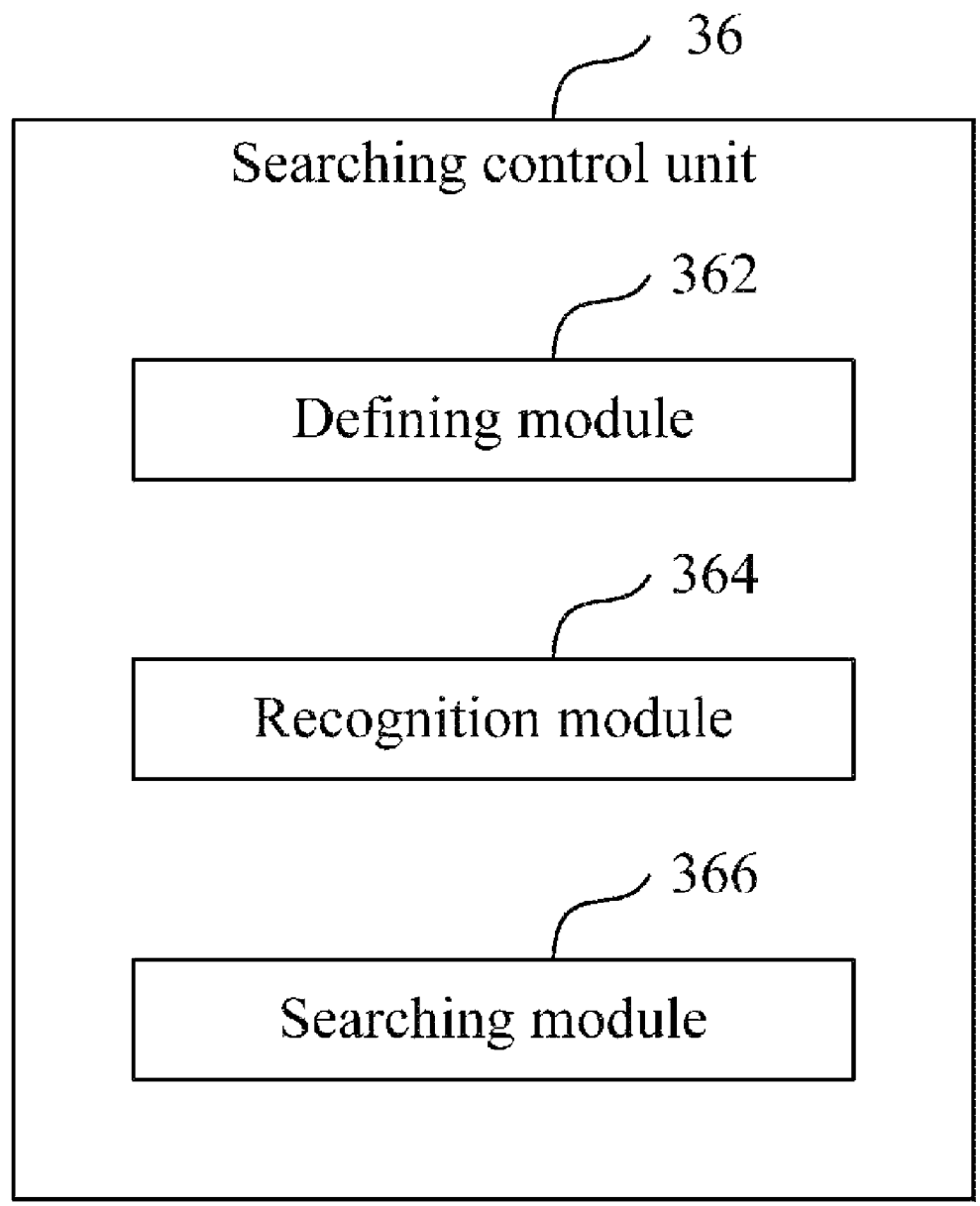
FIG. 9 is a block diagram of one embodiment of a searching control unit of the communication terminal of FIG. 8.

The searching control unit 36 is configured for searching the phone book 22 for the desired contacts. Further referring to FIG. 9, the searching control unit 36 includes a defining module 362, a recognition module 364 and a searching module 366. The processor 38 executes the three modules 362, 364 and 366 of the searching control unit 36.

The defining module 362 is configured for adding the reference color value for each contact in the phone book 22.

The recognition module 364 is configured for receiving the present image captured by the image acquisition device 32 and calculating the color value of the present image.

The searching module 366 is configured for comparing the reference color value for each contact in the phone book 22 with the color value of the present image one by one, determining whether the reference color value for any one of the contacts matches the color value of the present image, and selecting the desired ones of the contacts for which the reference color value matches the color value of the present image.

The display device 42 displays the contacts in the phone book 22 and the menus as shown in FIGS. 2-4 and 6-7.

The communication module 44 is configured for transmitting the present image or a short message to the communication addresses of one of the desired contacts in the phone book 22, or dialing one of the desired contacts. The communication addresses include the telephone numbers and the E-mail addresses.

Although certain inventive embodiments of the present disclosure have been specifically described, the present disclosure is not to be construed as being limited thereto. Various changes or modifications can be made to the present disclosure without departing from the scope and spirit of the present disclosure.

What is claimed is:

1. A computer-implemented method comprising:
enabling an image acquisition device to capture a present image;
calculating a color value of the present image;
comparing a reference color value for each contact in a phone book with the color value of the present image;
selecting one of the desired contacts comprises: calculating a difference between the reference color value for the one of the desired contacts and the color value of the present image;
selecting the one of the desired contacts if the numerical value of the difference is not larger than a predetermined threshold; and
displaying the desired ones of the contacts.

2. The method of claim 1, wherein the step of calculating the color value of the present image comprises: extracting color values of characteristic points of the present image to calculate an average color value as the color value of the present image.

3. The method of claim 1, further comprising of selecting a choice in the phone book for adding the reference color value for a selected contact; enabling the image acquisition device to capture a reference image of a reference object; calculating a color value of the reference image, storing the color value of the reference image into the phone book; and defining the color value of the reference image as the reference color value for the selected contact.

4. The method of claim 1, further comprising the step of selecting one of the desired contacts, and communicating with the one of the desired contacts.

5. The method of claim 4, wherein the communicating step is one selected from a group of steps consisting of: transmitting the present image to the communication address of the one of the desired contacts; transmitting a short message to the communication address of the one of the desired contacts; and dialing the one of the desired contacts.

6. A communication terminal comprising:
a storage medium for storing a phone book;
an image acquisition device for capturing images;
a processor executing a recognition module and a searching module, for searching the phone book for desired contacts; and
a display device for displaying the desired contacts;
wherein the recognition module is configured for enabling the image acquisition device to capture a present image and calculating a color value of the present image; and
the searching module is configured for comparing a reference color value of each contact in the phone book with the color value of the present image, and selecting the desired contacts for which the reference color value matches the color value of the present image;
wherein the processor further executes a defining module configured for selecting a choice for adding the reference color value for a selected contact; enabling the image acquisition device to capture a reference image; calculating a color value of the reference image; storing the color value of the reference image into the phone book; and defining the color value of the reference image as the reference color value for the selected contact.

7. The communication terminal of claim 6, wherein the action of calculating the color value of the present image comprises: extracting color values of characteristic points of the present image to calculate an average color value as the color value of the present image.

8. The communication terminal of claim 6, wherein the action of selecting one of the desired contacts comprises: calculating a difference between the reference color value for the one of the desired contacts and the color value of the present image; and selecting the one of the desired contacts if the numerical value of the difference is not larger than a predetermined threshold.

9. The communication terminal of claim 6, further comprising a communicating module configured for communicating with one of the desired contacts.

10. The communication terminal of claim 9, wherein the communicating action is one selected from a group consisting of: transmitting the present image to the communication address of the one of the desired contacts; transmitting a short message to the communication address of the one of the desired contacts; and dialing the one of the desired contacts.

11. A non-transitory computer-readable medium having stored thereon instructions that, when executed by a computerized device, cause the computerized device to execute a computer-implemented method comprising:
enabling an image acquisition device to capture a present image;
calculating a color value of the present image;
comparing a reference color value for each contact in a phone book with the color value of the present image;
calculating a difference between the reference color value for the one of the desired contacts and the color value of the present image;
selecting the one of the desired contacts if the numerical value of the difference is not larger than a predetermined threshold; and
displaying the desired ones of the contacts.

12. The non-transitory computer-readable medium of claim 11, wherein the step of calculating the color value of the present image comprises: extracting color values of characteristic points of the present image to calculate an average color value as the color value of the present image.

13. The non-transitory computer-readable medium of claim 11, further comprising the step of selecting a choice in the phone book for adding the reference color value for a selected contact; enabling the image acquisition device to capture a reference image of a reference object; calculating a color value of the reference image, storing the color value of the reference image into the phone book; and defining the color value of the reference image as the reference color value for the selected contact.

14. The non-transitory computer-readable medium of claim 11, further comprising the step of selecting one of the desired contacts, and communicating with the one of the desired contacts.

15. The non-transitory computer-readable medium of claim 14, wherein the communicating step is one selected from a group of steps consisting of: transmitting the present image to the communication address of the one of the desired contacts; transmitting a short message to the communication address of the one of the desired contacts; and dialing the one of the desired contacts.

* * * * *